July 8, 1924.

O. F. CARPENTER 1,500,231

GANG BORING MACHINE

Filed Nov. 3, 1921

Inventor
Oie F. Carpenter,

By

Attorney

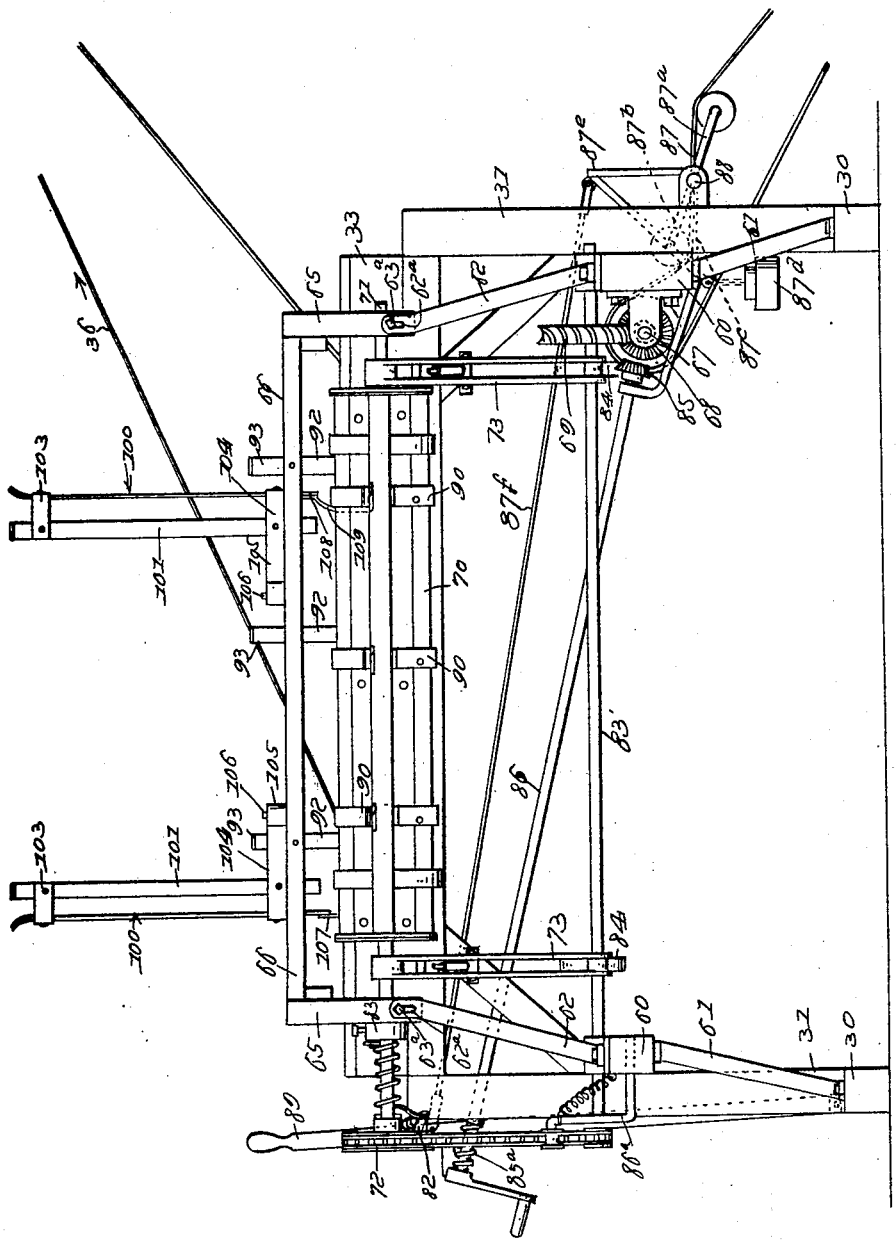

July 8, 1924.

O. F. CARPENTER
GANG BORING MACHINE
Filed Nov. 3, 1921

Inventor
Ose F. Carpenter
By [signature]

July 8, 1924. 1,500,231
O. F. CARPENTER
GANG BORING MACHINE
Filed Nov. 3, 1921 8 Sheets-Sheet 4
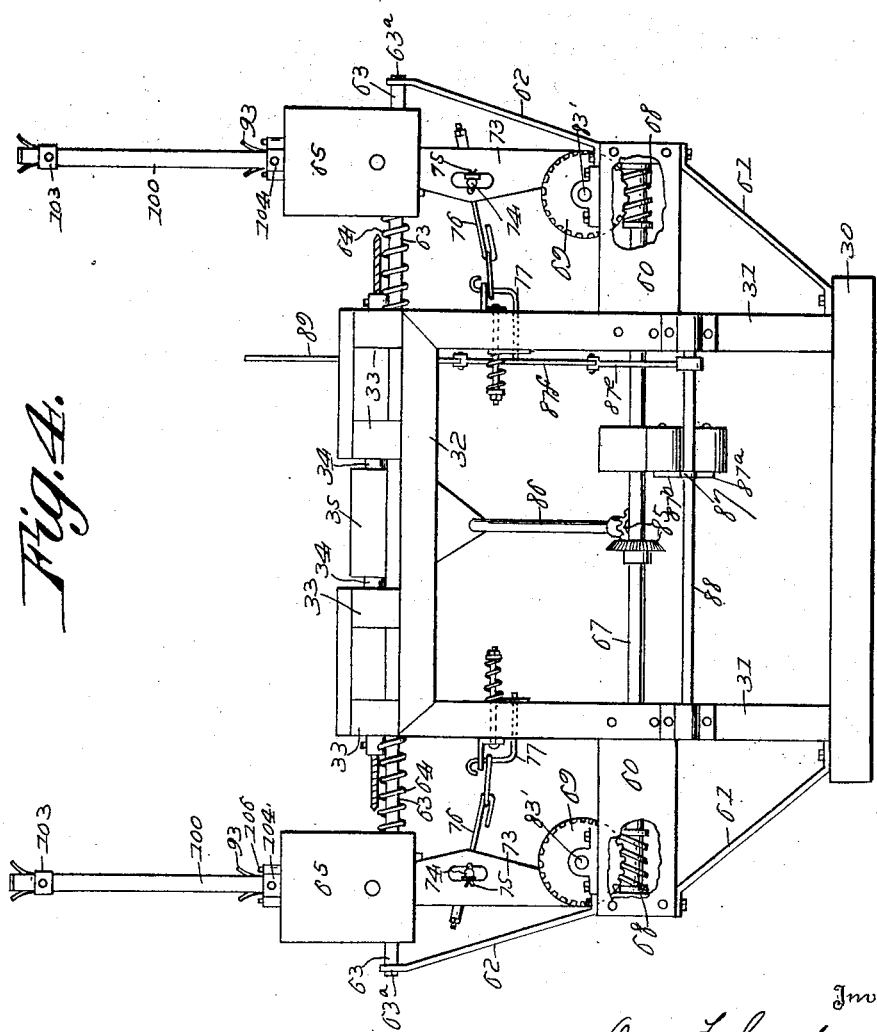

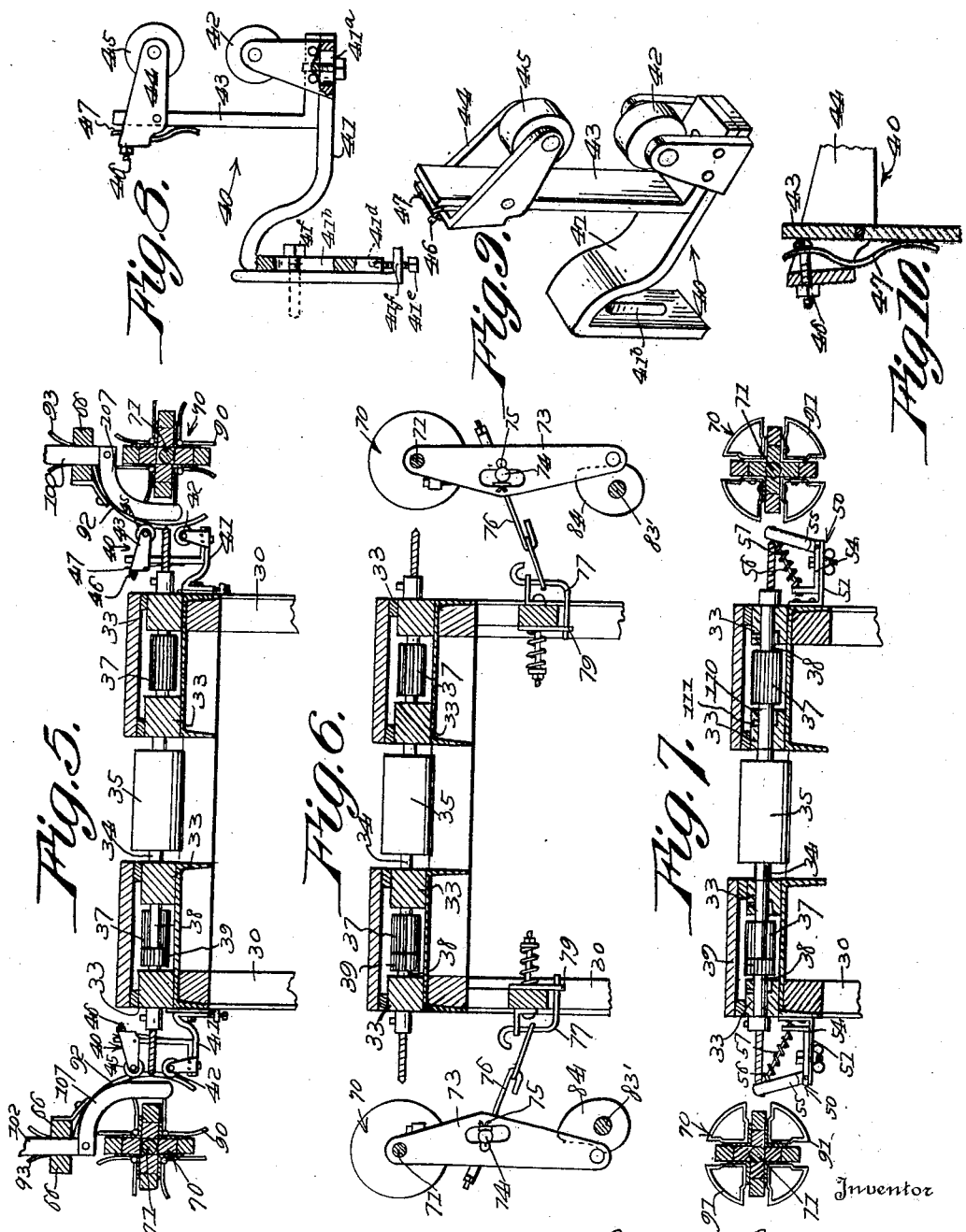
July 8, 1924.  
O. F. CARPENTER  
GANG BORING MACHINE  
Filed Nov. 3, 1921     8 Sheets-Sheet 5  
1,500,231

July 8, 1924.
O. F. CARPENTER
GANG BORING MACHINE
Filed Nov. 3, 1921
1,500,231
8 Sheets-Sheet 6
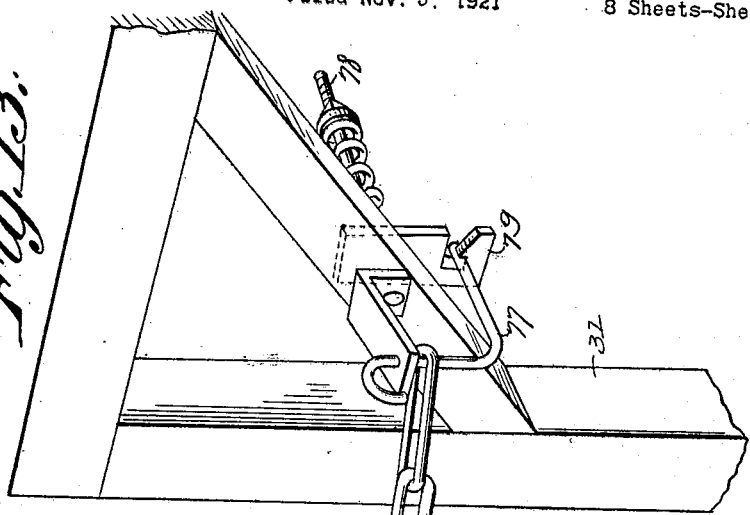
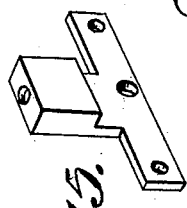
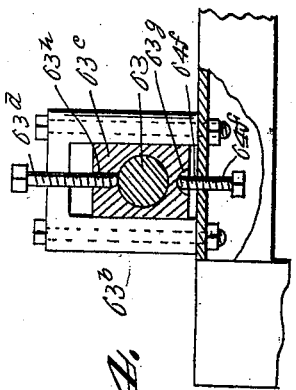
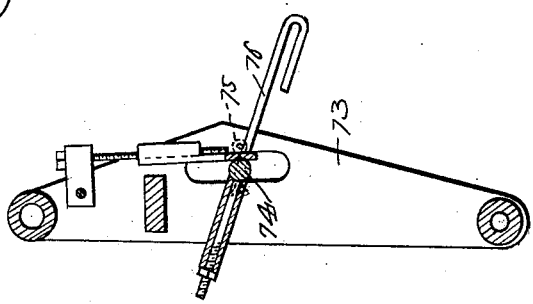
Inventor
Ose F. Carpenter.
By Frank Saaleman.
Attorney July 8, 1924.
O. F. CARPENTER
GANG BORING MACHINE
Filed Nov. 3, 1921
1,500,231
8 Sheets-Sheet 7
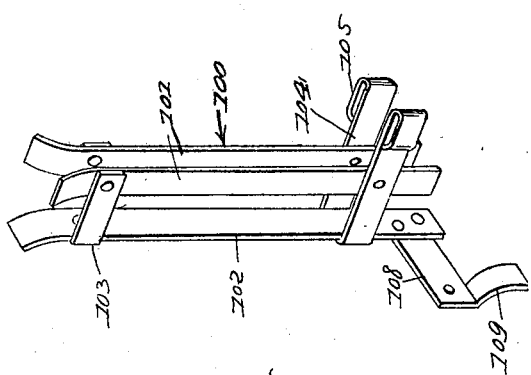
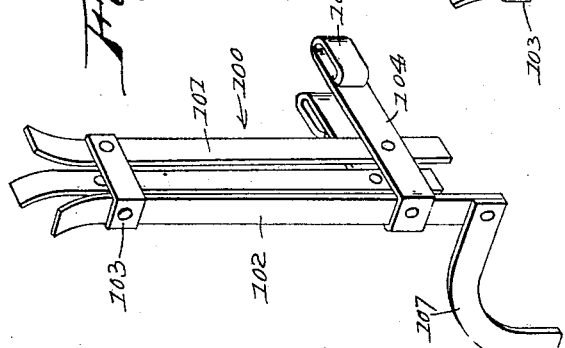
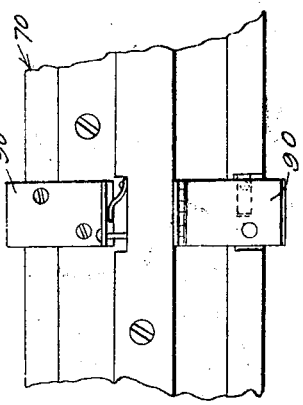
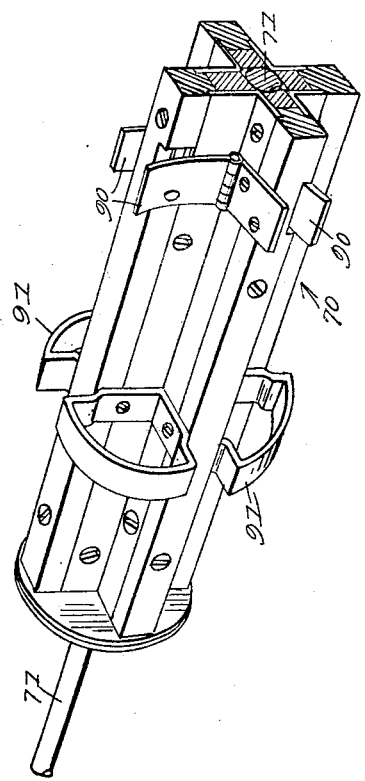
Inventor
Ose F. Carpenter.
By
Attorney July 8, 1924.
O. F. CARPENTER
GANG BORING MACHINE
Filed Nov. 3, 1921
1,500,231
8 Sheets-Sheet 8
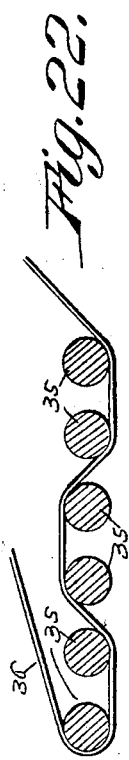
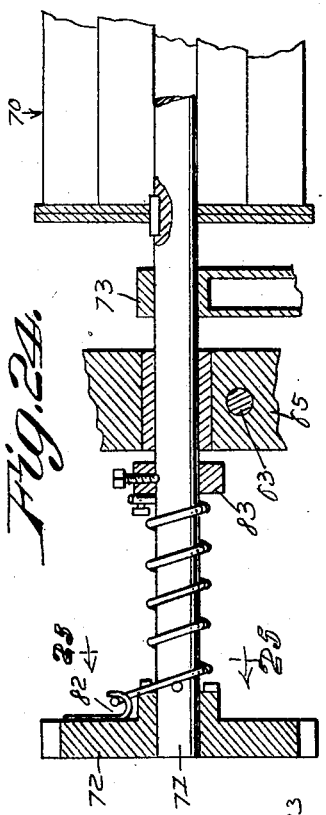
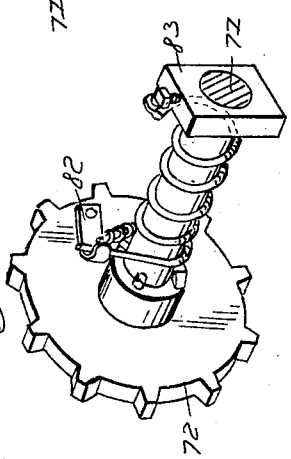
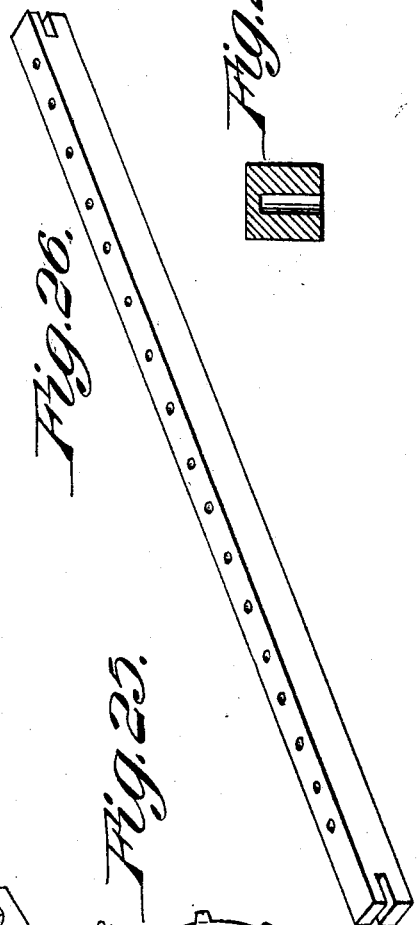
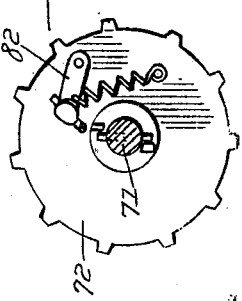
Inventor
Osc. F. Carpenter,
By
Attorney Patented July 8, 1924.

1,500,231

UNITED STATES PATENT OFFICE.

OSE F. CARPENTER, OF BRIGHTWOOD, VIRGINIA.

GANG BORING MACHINE.

Application filed November 3, 1921. Serial No. 512,543.

*To all whom it may concern:*

Be it known that I, OSE F. CARPENTER, a citizen of the United States of America, and resident of Brightwood, in the county of Madison and State of Virginia, have invented certain new and useful Improvements in Gang Boring Machines, of which the following is a specification.

This invention appertains to certain new and useful improvements in that type of gang boring machines which is adapted in use to bore in separate slats, rails or stiles, a plurality of alined recesses which are formed for the purpose of receiving ends of rods for dowel sticks which are used in the construction of poultry coops, cribs, grilles or the like. The invention has in view to provide a plurality of spindles or arbors which extend across a central frame, such spindles or arbors being in gear with shorter spindles which are driven therefrom. The driven spindles have at each end, boring tools and adjacent pairs of set spindles are driven in the same direction by means of a drive belt, driven preferably by an overhead pulley.

A gang boring machine made to embody my invention preferably has two rotary and laterally movable slat carriers, (although it may embody but one slat carrier), mounted on suitable frames for movement to and from the bits and the frames maintaining these rotary carriers have associated with them, magazines from which the slats are fed to the carrier.

The rotary carrier is operated by a different drive, and means are provided for adjusting the drive, which is continuous, setting the same, and to provide for a stoppage of the rotary slat carrier when a slat is presented to the bits.

My invention is also designed to provide the frame, which carries the bits, with means for throwing off the slats after having been bored by the bits, such frame also carrying means that engage and actuate clamps maintained by the rotary carrier.

My invention further consists in certain details of construction and organization of parts whereby adjustments may be effected and the drive for the laterally movable frame or frames may be rendered idle when desired.

With the above and other ends in view, as will hereinafter appear, my invention consists in certain details of construction, as will be hereinafter described and pointed out and claimed.

In the drawings forming part of this application, I have illustrated one form or type of my invention, Figure 1 being a plan view;

Figure 2 illustrates a side elevation;

Figure 4 illustrates an end elevation, showing the opposite end of the machine from that illustrated by Fig. 3;

Figure 5 illustrates substantially a transverse section on the line 5—5 of Fig. 1, the parts beyond the line on which the section is taken being omitted;

Figure 6 illustrates a section on the line 6—6 of Fig. 1, the parts beyond the line on which the section is taken being omitted;

Figure 7 illustrates a section on the line 7—7 of Fig. 1, the parts beyond the line on which the section is taken being omitted;

Figure 8 illustrates a detailed view of the slat centering device and clamp actuating means;

Figure 9 illustrates a perspective view thereof;

Figure 10 illustrates a sectional detail of a part of a rail centering and clamp actuating attachment;

Figure 13 illustrates a fragmentary view of an automatic throw-off or stop mechanism, which is operative in case of jamming slats while being positioned to be bored, the same also being operative from other causes arising out of improper feed of the slats to the rotary slat carrier;

Figure 14 illustrates in detail a sectional view of one of the advancing levers which are operatively associated with a rotary slat carrier and stop mechanism shown in Fig. 13;

Figure 15 illustrates in detail a perspective view of the adjustable hanger or carrier for the fulcrums of the levers shown in Fig. 14;

Figure 16 illustrates a detailed perspective view of the fulcrums for the levers;

Figure 17 illustrates a perspective view of a portion of the rotary slat holder;

Figure 18 illustrates a plan view of a portion of the rotary slat holder;

Figure 19 illustrates a perspective view of one of the end members of the magazine for the slats;

Figure 20 illustrates a perspective view of the other end member of the magazine;

Figure 21 illustrates a detailed perspective view of a portion of the frame which carries the magazine, showing the guides and holders for the slats;

Figure 22 illustrates a diagrammatic sectional view of the drive for the boring spindles;

Figure 23 illustrates a detailed perspective view of the drive take-up which is carried by the shaft of the rotary slat carrying cylinder;

Figure 24 illustrates a detailed longitudinal sectional view of the parts associated with the rotary slat carrier;

Figure 25 illustrates a section taken on the line 25—25 of Fig. 24;

Figure 26 illustrates a perspective view of one of the slats finished for use;

Figure 27 illustrates a cross section of the same; and

Figure 28 illustrates a detailed view of an adjusting means for the guide of the headpiece.

Figure 1:
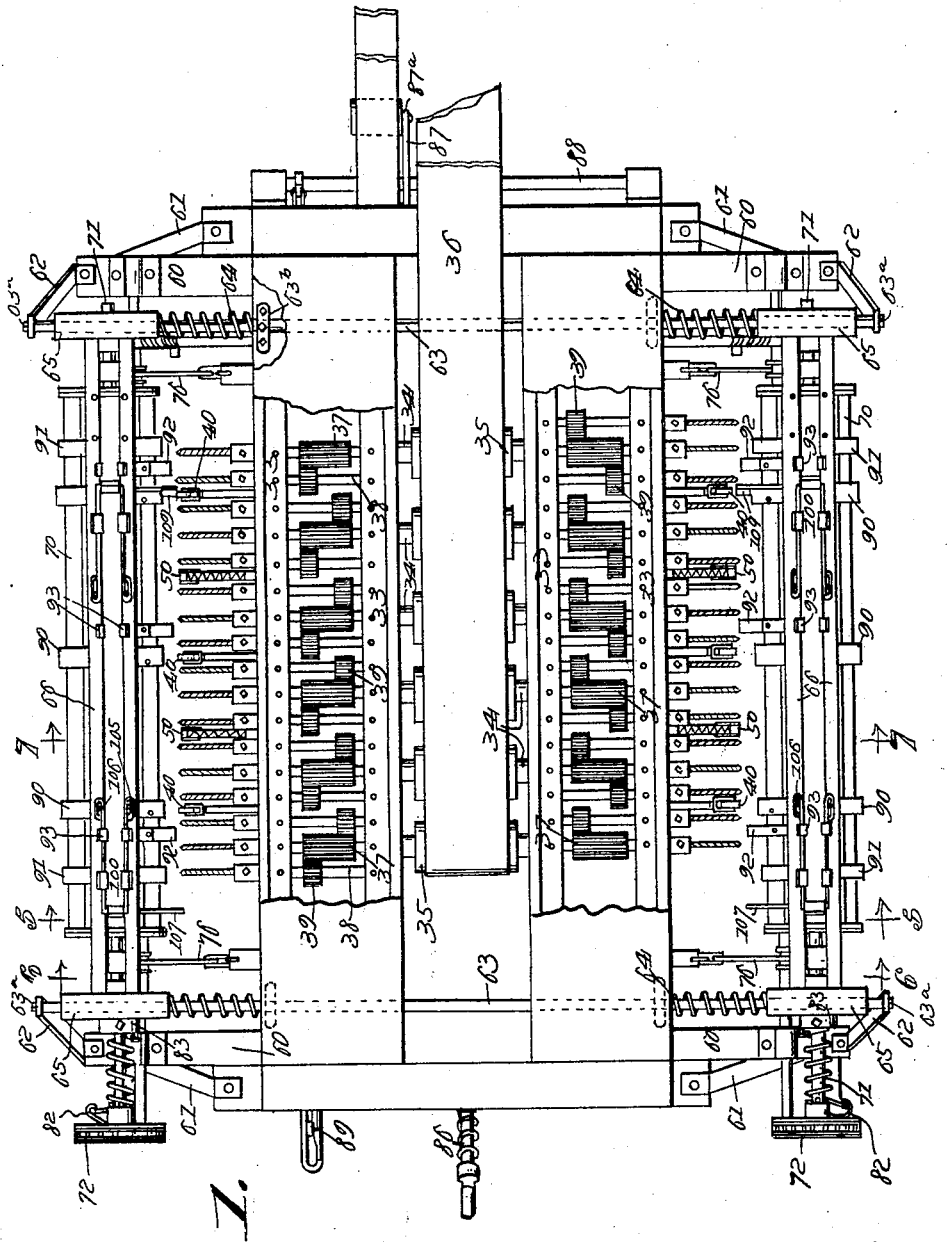

The main frame or support of the machine comprises sill pieces 30, uprights 31, cross beams 32, to which cross beams are attached a plurality of longitudinal beams 33 having bearings for spindles 34, which carry at each end beyond the outer longitudinal beams, chucks for bits or other suitable boring tools. The spindles have between the inner longitudinal beams 33, pulleys 35 that are engaged by a drive belt 36, the said belt being guided about the pulleys, as shown by Fig. 22, to drive in the same direction, adjacent pairs of spindles, and it will be noted that this particular drive permits the belt 36 to be driven by an overhead pulley.

The spindles 34 have keyed thereon, elongated toothed gears 37, and in parallel alinement with the spindles 34 are shorter spindles 38 having chucks or bit holders similar to the longer spindles, and these shorter spindles have pinions 39, spaced in staggered relation, as shown by Fig. 1, the pinions being so positioned as to admit of the spindles being maintained and driven in close relation to each other, and furthermore, the pinions engage the gears in positions which are out of transverse alinement in order that each pinion will operate on a different part of the gear wheel. This results in minimizing the wear on the gears, for it will be observed that if the pinions engage the gear wheels on opposite sides in a transverse line, the wear on the gear wheel would be twice that of the wear on the pinions, since two pinions would be engaging the same area of the gear wheel.

The frame, at suitable intervals, and on opposite sides has attached thereto, slat centering and clamp actuating means 40, the same consisting of an outwardly extending bracket 41 having a slot 41$^a$. The base of the bracket is slotted as shown at 41$^b$ to receive a securing element 41$^c$ which may be in the nature of a bolt or a screw, and the said base of the bracket has a seat 41$^d$ in its end to receive an adjusting screw 41$^e$ which is threaded through an apertured flange of the bracket plate 41$^f$ which is anchored on the frame by the screw of fastening 41$^g$. Rollers 42 are rotatably mounted between lugs that are secured to an upright 43, and this upright has a foot with a threaded aperture to receive a cap screw which extends through the slot of the bracket to permit an adjustment of the upright longitudinally of the bracket. An oscillatory yoke 44 is pivotally mounted on the upright, and a roller 45 is journaled therein. A bolt 46 extends through the yoke and through a leaf spring 47 which is interposed between the upright and the yoke, and the said spring bears against the yoke and exercises force thereon at a point above the point in which the yoke is pivoted to the upright.

The adjustment which is afforded the bracket makes it adaptable for boring materials of different cross sectional dimensions, and the adjustment of the slat supporting rollers renders the clamping action of the rollers also effective for operating on material of different cross sectional areas.

Figure 3:
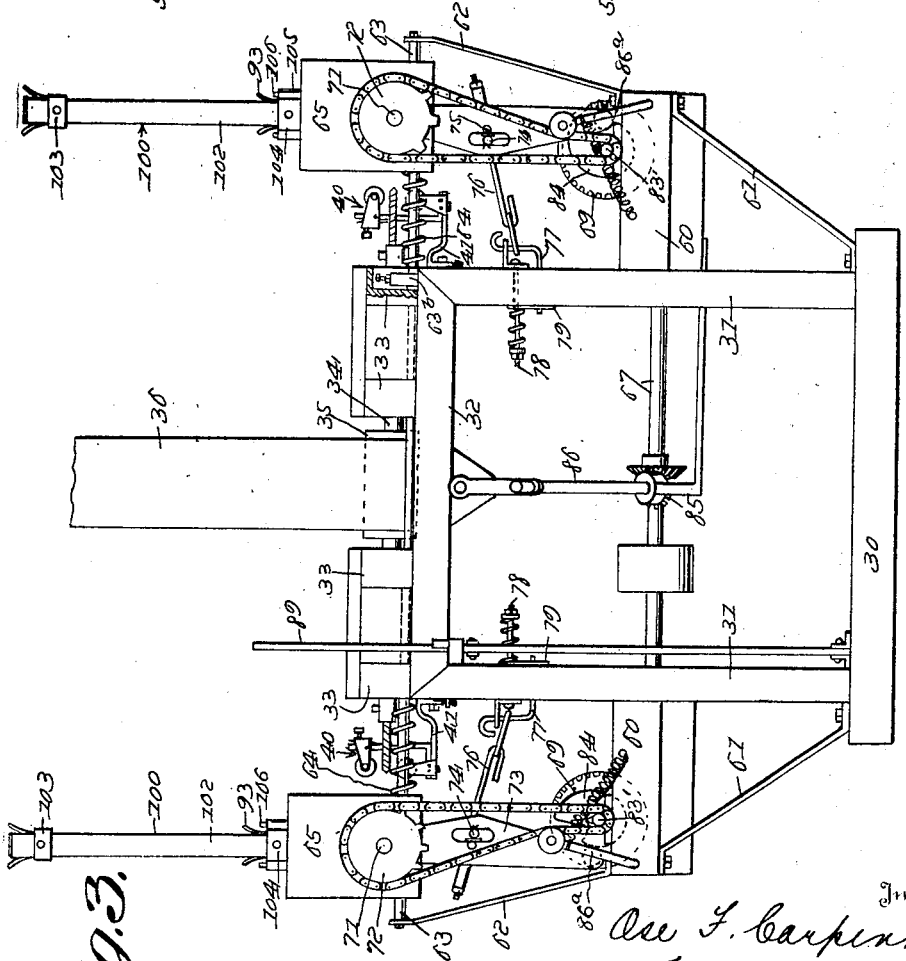
Figure 3 illustrates an end elevational view from the operating end of the machine.

A plurality of these centering devices 40, preferably three on each side of the frame between the bits, are provided for cooperation with a reciprocatory and rotary carrier for the slats to be bored, as shown by Figs. 3 and 5. It will be observed that each of the centering devices has an adjustable roller which provides means whereby the slats may be bored along the longitudinal center of the slats or to one side of a center to accord with the adjustment of the set screw 41$^e$; the adjustment of the bolt 46 provides for varying the range of movement of one of the leaves of a clamp associated with the rotary carrier.

In horizontal alinement with the brackets that maintain the slat centering and clamping means 40, the side frames of the machine have secured thereto, means as at 50, for pushing the slats, after being bored, away from the bits, the spring movement thereof also assisting in starting the carriers for the magazine and rotary slat carrying cylinder away from the bits. These members comprise angular brackets 51 with upstanding members 52, having apertures for the passage of screws or bolts for attaching these brackets to the frame, as shown more particularly by Figs. 1 and 7.

Figure 11:
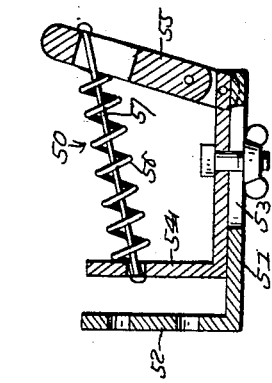
Figure 11 illustrates a sectional view of an attachment or means carried by the main frame for effecting a throw-off of the rails from the bits.
Figure 12:
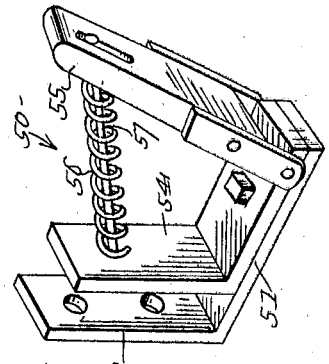
Figure 12 illustrates a perspective view of the parts shown in Fig. 11.

The horizontally maintained members 51, Fig. 11, of the brackets have slots 53 for the passage therethrough of bolts having winged nuts, the bolts adjustably associating therewith angle members 54 and to the outer ends of said angle members are pivoted presser bars 55, they being forced against the slats by springs 56 that encircle the rods 57 the rods serving to limit the movement of the throw-off or presser bars 55, and to maintain the springs in operative positions. The rods 57 pass through slotted openings in the part 55, and the opposite ends of said rods are movably connected to 54.

The uprights 31 of the main frame have at suitable distances above the sills outwardly projecting supports 60, brace rods 61 extending therefrom to the sills and upwardly extending braces 62 for engagement with the outer ends of rods 63, said rods extending across and beyond the main frame below the plane of the spindles having the boring bits. The rods 63 are encircled by springs 64, the inner ends thereof abutting against the main frame, while the other ends abut against slidable head-pieces 65, the head-pieces on opposite ends of the frame being connected by longitudinal shafts and by spaced bars 66, the bars serving as supports for the magazines which are maintained above the rotatable slat carriers.

The laterally extending supports 60 at the rear ends of the main frame have bearings for a transverse shaft 67, which has thereon a drive pulley and a beveled gear, both of which are located between the uprights 31; and adjacent to its outer ends this shaft 67 is provided with spiral gears or worms 68 which mesh with gears 69 on the longitudinal shafts carried by the bearings on the upper surfaces of the supports 60.

By reference to Figs. 3, 23, 24 and 25, it will be noted that the driven sprockets 72 are rotatable and slidable upon the shafts 71, such sprockets having clutch faces for engagement with a stud or pin carried by the shaft. These sprockets have pivoted to their inner faces a spring actuated pawl 82, one end of the pawl being bent to engage with a coiled spring which encircles a portion of the shaft 71; and the end of the spring, opposite the end that engages the pawl, engages a stop carried by a block that is made fast on the shaft, the said block engaging the head 65 opposite the lever 73. The construction illustrated provides an automatic take-up for movement of the rotary work carrier and insures proper positioning of the same to present the slats to be bored in a line with the bits. The longitudinal shafts 71 have keyed thereon the heads of the rotary work holders or slat carriers 70, and between the ends of these work holders and the head-pieces 65, the shafts are engaged by the upper ends of levers 73, each of the levers having slots through the side walls thereof through which slots are passed fulcrum pieces 74 which are manually adjustable to vary the throw of the levers and the movement of the rotary work holders to and from the bits, thus providing means for varying the depth of the holes in the work. The fulcrum pieces 74 are of a length sufficient to extend beyond the side pieces of the levers 73, and the extended ends are apertured to receive cotter pins, and centrally said fulcrum pieces are bored to receive a rod 76 having a threaded end over which is mounted a sleeve that is engaged by a nut on the threaded portion of the rod 76, which nut impinges against the sleeve to change the efficient length of the rod 76. The bent ends of these rods 76 engage a loop or link, which in turn, engages a latch bar 77 carried by a slide which is attached to a bar 78 having thereon a spring (see Fig. 13); and said latch bar normally engages a fixture 79 provided with a recess in which one end of the latch bar will lie. The means shown in detail by Figs. 13 to 16 inclusive, provides an automatically operated structure for releasing the levers 73 whenever an abnormal pull upon the fulcrums 74 occurs, the parts shown by Figs. 13 to 16 operating in case of a jam of the rails, from other causes connected with a feed from the magazines to the rotary slat carrying cylinders, this stop or release mechanism being effective only in case of failure of proper movement and feed of the work.

The hub of the gears 72 has projections with beveled faces and outwardly extending straight sides with which the pin that passes through the shaft 71 engages. This feature of the drive cooperates with the rotary slat carrier, the shifting levers and other parts and permits the use of a continuously driven belt as the prime actuating means for the aforesaid parts. The sprockets 72, as shown by Figs. 23, 24 and 25, are driven continuously or uninterruptedly by chain belts which engage sprockets on the longitudinal shafts having the gears 69 which mesh with the ones on shafts 67. The shafts have cams 84 for engaging with rollers located between the lower ends of the side pieces of the oscillatory levers 73.

The shaft 67 has a beveled gear that meshes with a beveled pinion 85 on a manually operated shaft 86, the shaft 86 being operated when it is desired to manually advance or retard the rotation of the shaft 83' which is connected to the shaft 71 by sprocket chains, as shown. The shaft 86 is slidable to move the gear wheels into and out of engagement with each other and they are normally held disengaged by a spring 85ª.

The sprocket chains are each engaged by a spring actuated tightener 86ª, and the belt 87 is engaged by a belt tightener which comprising two arms 87ª and 87ᵇ radiating from the shaft 88, the said arms carrying rollers for engaging the belt on opposite sides thereof. An arm 87ᶜ extends outwardly from the shaft 88 and carries a weight 87ᵈ, whereas an arm 87ᵉ is also connected to the shaft 88 and is pivotally connected to a thrust rod 87ᶠ which takes motion from the lever 89, and the said lever and the means just described controls the drive which is associated with the rotary slat carrier.

The intermittently rotated and horizontally maintained carrier 70 for the slats is shown in detail by Figs. 17 and 18 and consists of a cruciform central portion which surrounds a portion of the shaft 71, the same being made up of strips and angle irons which carry additional strips, against which the slats lie when being bored. The outer strips, at suitable intervals, are provided with recesses to receive springs which impinge against the inner faces of one of the leaves of hinge-like clips 90, between which the slats from a magazine are positioned, such clips being in line with the pressers 40 hereinbefore described. Each of the carriers 70 to one side of the clips 90 is provided with segmental fixtures 91 of such construction as to provide between them, slat receiving recesses and segemental faces, which segemental faces serve as closures for the bottom of the magazine from which the slats are fed.

The bars 66 which are arranged longitudinally upon the heads 65 carry slat retainers or holders 92 of curved formation, the downwardly extending curved portions being in line with the surface of the rotary slat carrier, and these holders extend above the bars 66 to provide short outwardly flared guides 93.

The magazines 100 in which the slats are placed and fed therefrom to the rotary carriers, as illustrated in detail by Figs. 19 and 20, consist of vertically maintained members 101 and 102 which have outwardly flared upper ends. The members 101 and 102 are at their upper ends connected by loops 103, said loops being attached to the members somewhat below their outwardly flared upper ends and loops 104 with side portions which extend beyond the members 101, the same being bent to provide slots 105 for the passage of attaching means 106, the attaching means being screws or the like, for adjustably connecting the magazines with the bars 66. The members 102 of the magazines located nearest the working end of the machine have attached thereto, curved depending portions or stops 107. These stops overlie or are opposite to the inner faces of the carriers 70, and against them, the slats may impinge while being fed from the magazines to the carriers, a portion of the edge of the member 107 engaging slats when the carrier is moved to such position as to present the slats to the bits. The opposite or other member of the magazine has attached thereto a bar 108, to the end of which is fastened a depending and curved pusher 109, the curved face thereof being adapted to engage with one end of a slat to press the same against the member 107, as such slats are being delivered to the rotary carrier between the segments 91 and the clips 90.

In operation, the magazine is adjusted upon the supporting bar 66 of the frame by moving either one or both of the supports in position to receive slats of a predetermined length. The belt 36 solely drives the spindles which carry at the opposite ends bits or boring tools, the spindles each turning at the same rate of speed. The operator stands at the front end of the machine and moves the lever 89 which operates the belt tightener that engages the belt 87 to effect rotation of the shaft 83' from which is driven a rotary slat carrier 70; the cams 84 engaging levers 73 move the carriers beneath the magazines from which slats are delivered between the segments 91 and the clips 90 when the same are positioned below the space between the supporting bars 66. The feed of the slats is arrested by the curved faces of the segments.

When one slat has been bored and the springs 64 thrust the slat carrier back disengaging the bits and the guide rollers, the coiled spring encircling the shaft 71, having been wound during the operation of boring the slat, causes the slat carrier to rotate one quarter turn instantaneously, discharging the bored slat from the machine and bringing the next slat in line with the bits; the spring actuated sprocket chain belt tightener serves as a shock absorber by allowing the sprocket 72 to make a quick, short rotary movement with the slat carrier as the pin through the shaft 71 engages the projections in the hub of the sprocket 72, thus checking the rotary motion of the slat carrier rather gradually, instead of abruptly, as would be the case if the ordinary fixed type of tightener were used. Besides, the rotary vibration mentioned above serves to facilitate the feeding of the slats from the magazines into the recesses in the slat carrier.

When the carrier has received a slat from its magazine and has moved to the position where it disengages the bits and the guide rollers 42 and the compression rollers 45, it makes a quarter turn instantaneously and is stopped or interrupted by the pin through the shaft 71 engaging the projections in the hub of the sprocket 72. The curved holders 92 serve to prevent the slat from being thrown from the carrier by centrifugal force and the curved faces of the segments 91 arrest the feed of the slats from the magazine while the carrier is making the quarter turn as described. At this position of the slat carrier, the slat just received by the carrier from the magazine is in line with the bits but not in contact therewith. The slat carrier is also in position to receive, and receives, the next slat from the magazine. At this position, the first slat is positioned to be bored by being forced or moved longitudinally by the pusher 109 which contacts at one end to slide the slat so that it will abut against the stop 107.

As the magazine moves inwardly upon the transverse bars 63, the springs 64 thereon will be compressed, and during such horizontal movement, the rollers on the frame 40 will engage the leaves 90 and securely clamp the slat between them. During the lateral movement of the rotary slat carrier, the knock-off 50, located between the bits, will be engaged and the springs thereof compressed. A further advance of the rotary carrier 70 brings the slat into contact with the bits which bore into the same for a depth which has been predetermined by setting the fulcrums of the levers 73 in the slots in the side pieces of the levers, and by adjusting the nut on the end of the rod 76. During the boring of the slat, the drive is not arrested, the sprocket wheel turning and winding the spring without affecting the shaft 71, and when the holes have been bored to the desired depth, the cams that engage the levers will have passed the rollers thereof and the springs on the transverse bars 63 will move the slat carrier and magazine to position where the slat is out of contact with the bits, the knock-off 50 serving to keep the bored slat forced back against the slat carrier as the slat disengages the bits, and as the carrier continues to move outwardly upon the transverse bars 63, the rollers on the frame 40 disengage the leaves 90, releasing the bored slat, and at this position the slat carrier makes a quarter turn instantaneously, discharging the bored slat from the slat carrier, bringing the second slat in line with the bits, and the third slat is received by the slat carrier from the magazine to repeat the operation.

In case of non-automatic operation from any cause, the fulcrums of the levers may be released to render said levers idle by manually swinging the retaining pins 77, when the lever 89 at the working end of the machine is moved from its operative position, the drive for the rotary slat carrier becomes non-effective, and to advance or retard the operation of the lever and the movement of the rotary carrier, the hand crank may be used to operate the shaft 67.

The gears including the gear wheels 37, spindles 38 and the pinions 39 are arranged to rotate in oil, and the beams 33 in which the spindle are journaled are recessed, as at 110, in their upper faces to form clearances for the admission of lubricant to oil ducts 111 which extend vertically from the upper surfaces of the frame to the spindle bearings.

As has been indicated in connection with the description of a part of the apparatus, the slat carrier is operated by the spring, the tension of which spring is being increased while the boring operation is being carried on. These parts operate in a way to minimize the length of time which transpires between the effective operation of the boring tools, and this results in increasing the capacity of the machine as compared with machines now in common use. For instance, the spring which rotates the carrier is under such tension as to almost instantly change the positions of the slat holding portions of the carrier to bring the successive slats into position to be operated on by the tools.

While this machine has been described in connection with the use of boring tools, it is to be understood that mortising tools or other wood working bits may be employed in connection with the carriers and the inventor does not wish to be limited with respect to this feature of the invention, since it is obvious that other bits may be substituted for the boring tools as described.

The brace 62 has a slot 62$^a$ near its upper end, and the guide rod 63 has a binding screw 63$^a$ threaded in its end, by which means, the guide rod 63 may be adjustably held at its outer end. The head is of course slidable on the guide rods and the slat carriers of the heads move into operative relation with adjustable clamps, so that the provision for moving the rod vertically permits the head to be moved in proper relation to the clamps as they may be adjusted. The guide rod is adjusted in brackets or bearings carried by the frame, and each said bracket, in the present embodiment of the invention, comprises a yoke 63$^b$ secured to the frame in appropriate manner, preferably as shown in Fig. 28, and this, of course, operates as a guide for a bearing block 63$^c$ held in different positions of adjustment by screws 63$^d$ and 64$^f$ which have their ends seated in an aperture 63$^h$ and a recess 63$^g$ respectively, the said screw 63$^d$ bearing against the rod, so that by moving these screws up or down, the height of the rod 63 may be adjusted. Of course it will be understood that during the adjustment, the screw 63$^a$ which holds the brace will be released and that after the adjustment has been made, the head of the screw will be tightened against the said brace to hold the parts in adjusted positions.

I claim:

1. In a boring machine which is provided with a plurality of bits that are maintained in alinement, driving means for the bits, a work carrier mounted for rotation and movement toward and away from the bits, and a magazine maintained above the work carrier to be movable therewith.

2. In a gang boring machine, a plurality of boring tools maintained in a line with each other, means for rotating said boring tools, an intermittently rotatable work carrier mounted to be movable toward and away from the boring tools, means for causing a cessation of the rotation of the work carrier when the movement thereof toward the boring tools is such as to place the work in engagement with the boring tools and means operating as a stop mechanism controlled by the position of a slat in the slat carrier.

3. In a gang boring machine, a support for a plurality of constantly driven boring tools, clamp engaging means maintained by the support, a rotatable and laterally movable work carrier provided with clamps and a magazine from which the slats are fed successively to the work carrier to be engaged by the clamps, said work carrier being movable to bring the clamps to position to be engaged by the clamp engaging means on the support and means organized and controlled by lateral movement of the work carrier to effect a release of the drive thereof.

4. In a boring machine having a plurality of boring bits, a magazine, an intermittently rotatable carrier to which the work is fed from the magazine, the magazine and rotary carrier being associated for simultaneous horizontal movement toward and away from the boring bits, levers with which the rotary carrier is associated, said levers having longitudinal slots to provide for adjustment of movable fulcrums, and means to provide for an automatic release of the fulcrums.

5. In a boring machine, a supporting frame, a plurality of spindles provided with boring bits, guide rollers carried by the supporting frame and positioned above and below the plane of the bits, slat engaging means maintained to move the slats away from the bits, and a laterally movable and rotary work carrier having clamps which are effective when engaged by the rollers carried by the supporting frame.

6. A gang boring machine comprising a support having driven spindles with which are associated boring tools, a rotatable work carrier maintained for lateral movement to and from the boring tools, means for imparting lateral movement to the work carrier, means for intermittently rotating said work carrier and means for restricting lateral movement of the work carrier rendered operative by inappropriate position of a slat in said work carrier.

7. A gang boring machine comprising a support having driven spindles to which are attached boring tools, a laterally movable and intermittently rotatable work carrier maintained by the support and levers associated with the work carrier for moving the same laterally, and means for intermittently causing a cessation of the rotary movement of the work carrier.

8. In a gang boring machine, a support having a plurality of rotatably maintained boring bits, a laterally movable and intermittently rotatable work carrier maintained by the support, oscillatory levers which engage with the work carrier, and means for arresting the rotary movement thereof when the work carried thereby is engaged by the bits and auxiliary means for automatically restricting rotary movement of the work carrier when a slat to be bored is not in proper position for boring.

9. A gang boring machine comprising a plurality of driven spindles to which are attached boring bits, a rotary work carrier mounted for intermittent rotation and for movement to and from the bits, levers engaging the work carrier said levers having slotted bearings for the fulcrums of the levers, adjustable fulcrums for the levers, and means for oscillating the levers to effect movement of the work carrier toward the boring bits.

10. The combination in a boring machine having a plurality of boring bits which are maintained in longitudinal alinement, a work carrier mounted for rotation and for horizontal movement toward and away from the bits, of a stop mechanism, and means for rendering the stop mechanism effective occasioned and operating by the positioning of a slat improperly in the work carrier.

11. A gang boring machine having a series of boring bits, means for driving the bits, a rotary work carrier, levers associated with a supporting means of the work carrier, and operative to move the carrier toward the bits, and means associated with the work carrier for interrupting the rotation of the same when the work maintained by said carrier is positioned to engage the bits.

12. A gang boring machine having a series of boring bits, means for constantly driving the bits, a rotary work carrier having a different drive from the drive for the bits, means actuated by said drive for moving the work carrier toward the bits, means for interrupting the rotation of the work carrier when the work carried thereby engages with the bits, and means for laterally moving the work carrier and the levers.

13. A gang boring machine having a plurality of spindles to which are attached boring bits, means for rotating the spindles, a work carrier maintained for rotation and for movement to position the work carried thereby in engagement with the bits, oscillatory levers which engage the work carrier to effect movement thereof toward the bits, adjustable fulcrums for the levers, and means for moving the work carrier in an opposite direction from which it is moved by the levers, and means for holding the work carrier against rotary movement at a period when the bits engage with the work maintained by the carrier.

14. A gang boring machine comprising a plurality of bit carrying spindles arranged in line, driving mechanism for the spindles, means for engagement with the work maintained in fixed positions between the bit carrying spindles, a work maintaining carrier which is movable toward the bit, other means for moving the carriage to place the work out of engagement with the bits and means including suspended levers having movable fulcrums which are attached to catches so that the levers may be released and moved to non-operative positions when unusual pressure is exerted upon the fulcrums of said levers.

15. In combination with a gang boring machine having a plurality of bit carrying spindles, means for driving said bits, a horizontally and laterally movable revoluble work carrier having a drive which is independent of the drive for the bit carrying spindles, means for arresting the rotation of the revoluble work carrier without arresting the drive therefor, means for moving the work carrier toward the bits of the bit carrying spindles, means other than the drive for arresting the lateral movement of the carriage during a period before the bits engage the work serving as an automatic stop motion operating by the improper placing of a slat in the work carrier, and means that engage the work presented to the bits operated by movement of the carriage.

16. A gang boring machine comprising a supporting frame, bit carrying spindles maintained in a fixed position except as to rotation by the frame, clamp engaging means and work engaging means carried by the frame and positioned adjacent to the boring bits, a rotary work carrier maintained opposite the bit carrying spindles, means for moving the work carrier toward the bits, other means for moving the work carrier away from the bits, means associated with the work carrier and its drive for arresting the rotation of said work carrier at a period when the work maintained by the work carrier is engaged by the bits, and means for automatically restoring the rotary work carrier to its initial position.

17. The combination in a movable bit boring machine, a work carrier, a magazine associated with the work carrier, means for feeding slats successively from the magazine to the work carrier, a drive for the work carrier, levers with which the work carrier is associated, means for oscillating the levers, a variable fulcrum for the levers, said fulcrum being flexibly connected to a release mechanism operative only in case of failure of proper feed of slats to the work carrier.

OSE F. CARPENTER